United States Patent [19]

Armitage

[11] 4,406,191
[45] Sep. 27, 1983

[54] WORK SHAPING

[76] Inventor: Harry J. Armitage, 1546 Cavitt Rd., Monroeville, Pa. 15146

[21] Appl. No.: 264,804

[22] Filed: May 18, 1981

[51] Int. Cl.³ .............................................. B23B 3/28
[52] U.S. Cl. ...................................... 82/14 C; 82/3; 60/538
[58] Field of Search .............. 82/3, 14 A, 14 B, 14 C, 82/21 A; 60/537, 538, 545

[56] References Cited

U.S. PATENT DOCUMENTS

| | | | |
|---|---|---|---|
| 2,858,745 | 11/1958 | Dever | 82/14 A |
| 3,014,390 | 12/1961 | Garde et al. | 82/14 C |
| 3,026,680 | 3/1962 | Evans | 82/14 A |
| 3,034,300 | 5/1962 | Hachenberg | 60/538 |
| 3,264,910 | 8/1966 | Kindelan | 82/3 |
| 3,555,441 | 1/1971 | Cudnohufsky | 82/14 C |
| 3,950,948 | 4/1976 | Luke | 60/538 |
| 3,969,965 | 7/1976 | Hawkins | 82/3 |
| 4,016,784 | 4/1977 | Brown | 84/14 B |

Primary Examiner—Leonidas Vlachos
Attorney, Agent, or Firm—Hymen Diamond

[57] ABSTRACT

The work is a plurality of blanks whose inner or outer surfaces are to be shaped to form molds. The blanks are mounted rotatably in synchronism with a master having the contour for shaping the blanks. A tracer in engagement with the contour and tools in cutting engagement with the blanks are mounted on a slide movable laterally with respect to the axes of the blanks and master as commanded by the contour. The slide is moved axially with respect to the blanks and master so that the tracer follows the contour moving transversely inwardly and outwardly. The tracer is coupled to a linear variable differential transformer (LVDT) which produces an electrical signal corresponding to the transverse movement of the tracer. The signal drives a low-inertia motor which rotates a screw in one direction or the other depending on the instantaneous polarity of the signal. The screw is in engagement with a nut. The nut is prevented from rotating and advances or retracts depending on the direction of rotation of the motor. The nut drives a controlling piston in a controlling cylinder in a closed-loop fluid system back and forth. The closed-loop system also includes a driving cylinder including a driving piston. The driving piston moves the slide transversely backwards and forwards moving the tracer and tools so that the tools follow the tracer and shape the blanks.

16 Claims, 11 Drawing Figures

WORK SHAPING

BACKGROUND OF THE INVENTION

This invention relates to the art of work shaping and has particular relationship to work shaping in which the work is shaped in accordance with the movement of a tracer guided by the contour on a master or of a template. As illustrated in this application, the invention is embodied in mold-forming apparatus typically for forming molds for producing bottles with bass-relief decorations such as the bottles for carbonated drinks. This illustration of the invention is resorted to only so as to facilitate the understanding of this invention by describing it with reference to a concrete embodiment. To the extent that this invention is applicable to other types of work shaping, such application is within the scope of this application or of any patent which may issue on or as a result thereof.

In work shaping, the work which may include a number of blanks to be shaped and a master are mounted rotatably on the apparatus, typically on the head stock of a machine. The tracer is mounted in engagement with the contour of the master and cutting tools are mounted in engagement with the blanks on a member which is sometimes described as the tail stock of the machine. The member is moved axially so that the tracer follows the contour moving transversely of the master and blanks. To maintain the tracer in following engagement with the contour and the tools in appropriate shaping engagement with the blanks, the member is moved transversely in accordance with the transverse movement of the tracer. It is conventional practice to drive the member hydraulically. In accordance with the teachings of the prior art, the flow of hydraulic fluid which controls the member carrying the tracer and tools is derived from a reservoir through a valve. The valve is in turn controlled by the tracer through a transducer. A disadvantage of this prior art apparatus is that the operation of the valve is sluggish so that there is a delay in the response of the member to the contour following movement of the tracer.

It is an object of this invention to overcome the above-described drawback of the prior art and to provide work-shaping apparatus in which the transverse movement of the member carrying the tracer and tools shall respond without any appreciable delay to the tracer movement and shall follow the tracer precisely.

SUMMARY OF THE INVENTION

In accordance with this invention, the movement of the member carrying the tracer and tools is controlled by the tracer through a closed-loop fluid system. The reservoir and sluggish valve are dispensed with. The transverse movement of the tracer produces a signal which controls the rotation of a motor that drives a screw in engagement with a non-rotatable nut. The nut moves a piston in a cylinder in the closed-loop fluid system back and forth. The piston moves the member which carries the blank in accordance with the transverse tracer movement.

The above-described apparatus may include a single piston responsive to the tracer. However, in the use of such a system, brinelling or hardening of the screw has been encountered. An aspect of this invention arises from the realization or discovery that the brinelling is caused by the fatigue produced in the metal of the screw by the back and forth movement of the screw, responsive to the transverse movement of the tracer, over a very small angle. In accordance with an aspect of this invention, the brinelling is overcome by providing a closed-loop fluid system which permits the screw to rotate over a large angle. To achieve this purpose, an auxiliary or controlling cylinder and piston are interposed in the closed-loop fluid system between the screw and nut and the main piston which drives the member carrying the tracer and tools. The auxiliary cylinder has a bore so related to the bore of the main cylinder in which the main piston operates, that displacement of the auxiliary piston produces a substantially smaller displacement of the main piston. For example, in one situation, displacement of the main piston is somewhat less than ¼ displacement of the auxiliary piston, a stroke of 17 inches of the auxiliary piston producing a stroke of 4 inches of the main piston. This relationship is only typical. The ratio may be 1/6, ⅛ or 1/16 or even higher. To assure rapid response of the pistons in the closed-loop fluid system to the movement of the tracer, the motor which drives the screw is substantially inertia-less.

BRIEF DESCRIPTION OF THE INVENTION

For a better understanding of this invention, both as to its organization and as to its method of operation, together with additional objects and advantages thereof, reference is made to the following description taken in connection with the accompanying drawings, in which.

DETAILED DESCRIPTION OF EMBODIMENTS

Figure 1:
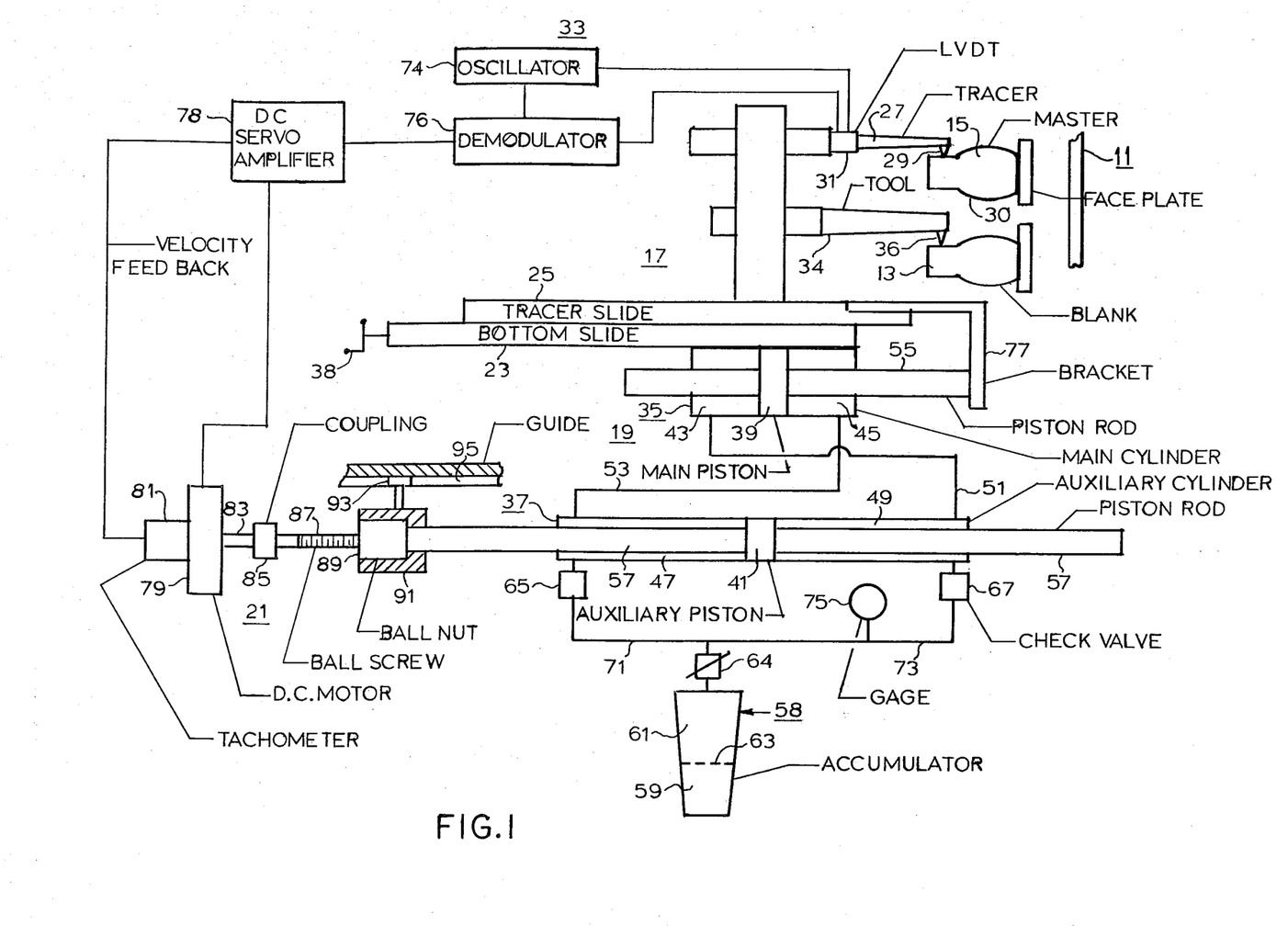
FIG. 1 is a diagrammatic view showing important features of this invention.

FIG. 1 shows diagrammatically important operational components of the apparatus; i.e., of the machine, shown in FIGS. 2 through 8. The apparatus shown in FIG. 1 includes a support or housing 11 for the blanks 13 and master 15. Only one blank 13 is shown but in the practice of this invention there are plurality of blanks. FIG. 1 also shows a part of the slide assembly 17 of the apparatus shown in FIGS. 2A and 2B, a closed-loop fluid system 19 and a drive 21 for actuating the closed-loop system.

The slide assembly 17 includes a bottom slide 23 and a tracer slide 25. The tracer slide 25 carries a tracer 27 whose head 29 engages and follows the contour 30 and the external surface of the master 15. Where the contour to be followed is in the inside surface of the master, the tracer 27 is so structured that its head 29 engages the internal contour. The tracer 27 is also connected to a transducer 31, typically an LVDT. The transducer 31 supplies its intelligence to a control 33 which controls the drive 21. The tracer slide 25 also carries the cutting tools 34 whose heads 36 are in cutting engagement with the blanks 13. The bottom slide 23 is provided with a handle 38 for appropriately setting the tracer 27 and the tools 34 transversely with reference to the master 15 and blanks 13.

The closed-loop fluid system 19 includes a main cylinder or driving cylinder 35 and an auxiliary cylinder or controlling cylinder 37. The main cylinder has a main piston or driving piston 39 and the auxiliary cylinder has an auxiliary or controlling piston 41. The main piston 39 divides the main cylinder into first and second chambers 43 and 45 whose volumes vary as the main piston is moved backwardly or forwardly. The auxiliary piston 41 divides the auxiliary cylinder into third and fourth chambers 47 and 49 whose volumes vary as the auxiliary piston 41 is moved backwardly and forwardly. There is a fluid conductor 51 between the first and fourth chambers 43 and 49 and another fluid conductor 53 between the second and third chambers 45 and 47. Movement of the auxiliary piston 41 in a first direction, towards the right with reference to FIG. 1, causes fluid to flow from the fourth chamber 49 to the first chamber 43 displacing the main piston 39 in a second direction, towards the right with reference to FIG. 1. Movement of the auxiliary piston 41 in a third direction, towards the left with reference to FIG. 1, causes fluid to flow from the third chamber 47 to the second chamber 45 displacing the main piston 39 in a fourth direction, towards the left with reference to FIG. 1. The directions of movement of the pistons 39 and 41 are identified as first, second, third and fourth because the cylinders 35 and 37 can be in many different positions rather than horizontal as shown in FIG. 1. Each piston 39 and 41 is provided with a piston rod 55 and 57 which extends on both sides of the piston so that the cross sections of the fluid-filled volumes on both sides of each piston remains the same for each cylinder 35 and 37.

Displacement of the main piston 39 in the second direction, as a result of movement of the auxiliary piston 41 in the first direction, also causes fluid to flow through conductor 53 from the second chamber 45 to the third chamber 47 ultimately equalizing the pressure on both faces of auxiliary piston 41 unless the auxiliary piston continues to move in the first direction. Displacement of the main piston 39 in the fourth direction, as result of movement of the auxiliary piston 41 in the third direction, causes fluid to flow from the first chamber 43 to the fourth chamber 49 ultimately equalizing the pressure on both faces of auxiliary piston 41 in the absence of further movement by piston 41.

An accumulator 58 is provided for replenishing any fluid which undesirably leaks from the closed-loop fluid system 19. This accumulator includes chambers 59 and 61 separated by a membrane 63. The chamber 59 contains gas or other fluid at a predetermined pressure; the chamber 61 contains the fluid, typically a light oil, which is contained in the cylinders 35 and 37. The chamber 61 is connected to the chambers 47 and 49 of the auxiliary cylinder 37 through a manual valve 64 and check valves 65 and 67. Leakage of fluid from the closed-loop fluid system 19 reduces the pressure in chambers 47 and 49. The check valves 65 and 67 open and the leaked fluid is replenished. The accumulator 58 and its fluid conductors 69, 71 and 73 are provided with a pressure gauge 75.

The cross-sectional area of the chambers 47 and 49 of cylinder 37 which contains the fluid is substantially smaller than the cross-sectional area of chambers 43 and 45 of cylinder 35 which contains the fluid. Typically, the bore of cylinder 37 is about 1½ inches, while the diameter of piston rod 57 is 1 inch. The cross-sectional area of the volume which contains the fluid is then:

$$\pi \left(\frac{3}{2}\right)^2 - \pi$$

The bore of cylinder 35 is typically 2½ inches and the piston rod 55 has a diameter of 1 inch. The cross-sectional area of the volume of cylinder 35 which contains the fluid is then:

$$\pi \left(\frac{5}{2}\right)^2 - \pi$$

The ratio of the area is:

$$\frac{\left(\frac{5}{2}\right)^2 - 1}{\left(\frac{3}{2}\right)^2 - 1} = \frac{21}{5}$$

or somewhat greater than 4/1. The displacement of piston 39 is then about ¼ the displacement of piston 41. Piston 39 drives bracket 77 through piston rod 55. This bracket 77 is connected to tracer slide 25 which carries the tracer 27 and tools 34 moving the tracer and tools transversely with reference to the work in accordance with the displacement of the auxiliary or control piston 41 and the driving piston 39.

The drive 21 includes a motor 79. The motor drives a tachometer 81 which produces a voltage dependent on the velocity of the motor 79. The signal is supplied to the control 33 as a negative feedback to suppress hunting of the drive 21.

The motor 79 and tachometer 81 are both of low inertia. Typically each is of the moving coil, OC, permanent magnet type. The motor 79 is sometimes referred to as a printed-armature motor. A satisfactory motor can be procured from PMI Motors, a Division of Koll Morgan. PMI is in Syosset, New York. The unit consisting of motor 79 and tachometer 81 are bought under the identification M19-U9. The maximum speed of the motor 79 is about 1,600 R.P.M. The motor can be reversed from 1,600 R.P.M. in one direction to 1,600 R.P.M. in the opposite direction in about 1/40 second.

Where the transducer is an LVDT 31, the control 33 includes an oscillator 74, a demodulator 76, and a DC servo amplifier 78. Typically the oscillator 74 has a frequency of 2.5 KH. The oscillator 74 supplies current to the primary of the LVDT and oscillations to the demodulator. The oscillations are properly phased with reference to the current supplied to the LVDT so that the output of the LVDT 31 is demodulated to produce DC at its output. The output of the amplifier 78 is supplied to drive motor 79. The negative feedback from the tachometer 81 is supplied to the input of the amplifier 78. The control 33 cooperates with the motor 79 as a null-seeking servo system; i.e., the control operates in such a sense as to tend to reduce the input to the motor to zero.

The motor shaft 83 is connected through a coupling 85 to a ball screw 87. The ball screw 87 engages a ball nut 89 which is secured on a housing 91. The housing carries a ball bearing stud 93 which engages a slot 95. The nut 89 and housing 91 are prevented from turning by the slot 95. When the screw 87 turns in one direction or the other, the nut 89 is displaced linearly in one direction or the other. The nut 89 is connected to piston rod 57 and this rod is advanced or retracted by nut 89 correspondingly displacing auxiliary piston 41. Piston 41 is thus displaced in accordance with the movement of tracer head 29 producing displacement of main piston 39 and appropriate movements of the tools 34 and tracer 27 transversely to the master 15 and blanks 13.

The apparatus shown in FIGS. 2 through 8 is a machine 101 embodying the invention. This machine includes the mechanical components shown in FIG. 1. These components are labeled in FIGS. 2 through 8 with the same identification numbers as in FIG. 1.

The machine 101 includes a base or bed-plate 103 (FIG. 2B) which is a casting including internally a longitudinal tube 105 so that it has adequate strength. At its ends, the base is supported on hollow box-like supports 107 and 109 (FIGS. 7A, 7B) open in the rear. Across these boxes 107 and 109, terminal strips 111 are supported on brackets (not shown). The strips 111 have terminals 115 through which the electrical components of the apparatus (FIG. 1) and the components of the console (not shown) by means of which the machine 101 is monitored and controlled are interconnected through appropriate conductors and cables 117. In the front, the boxes 107 and 109 have holes 118 and 120 (FIG. 4) through which the conductors and cables 117 are passed.

Figure 2A:
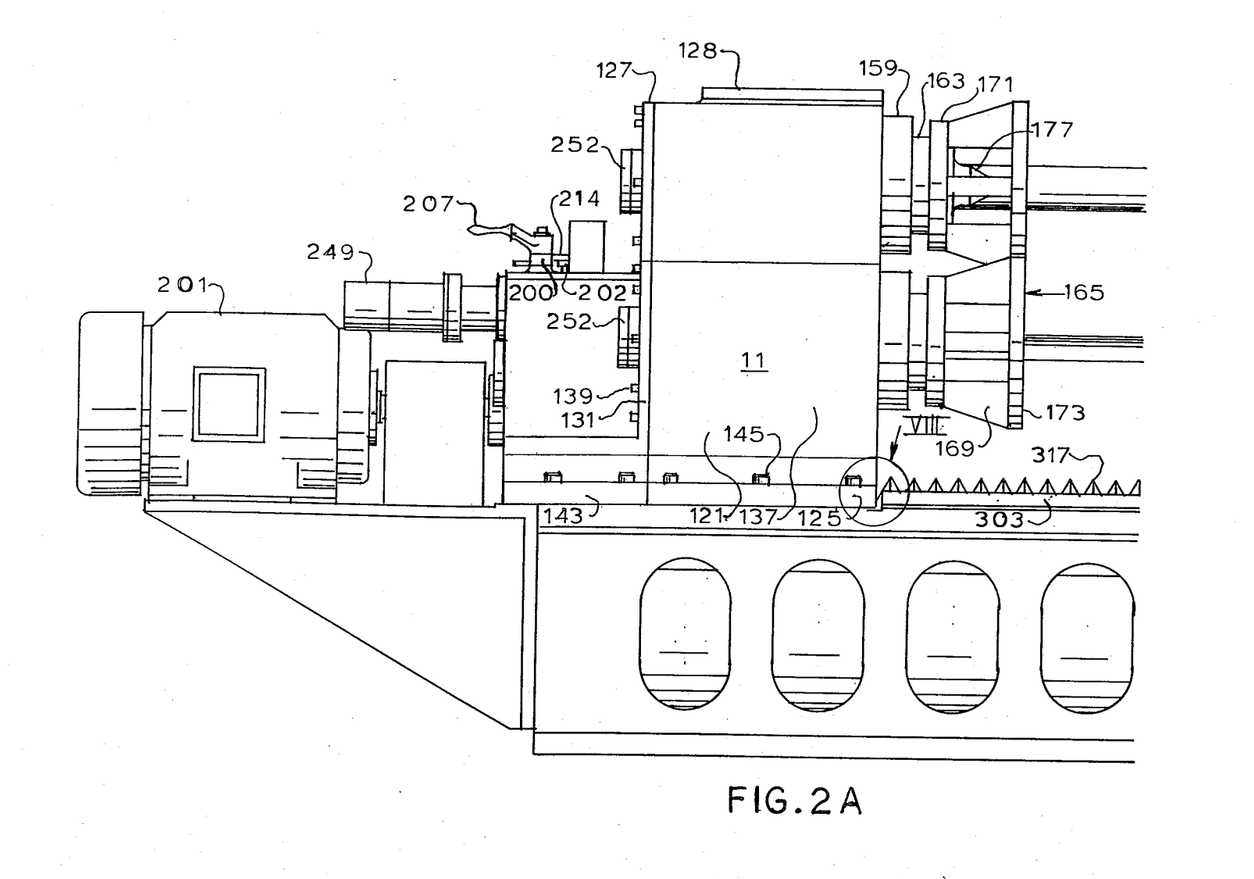
FIGS. 2A and 2B together are a front view of an embodiment of this invention.
Figure 3A:
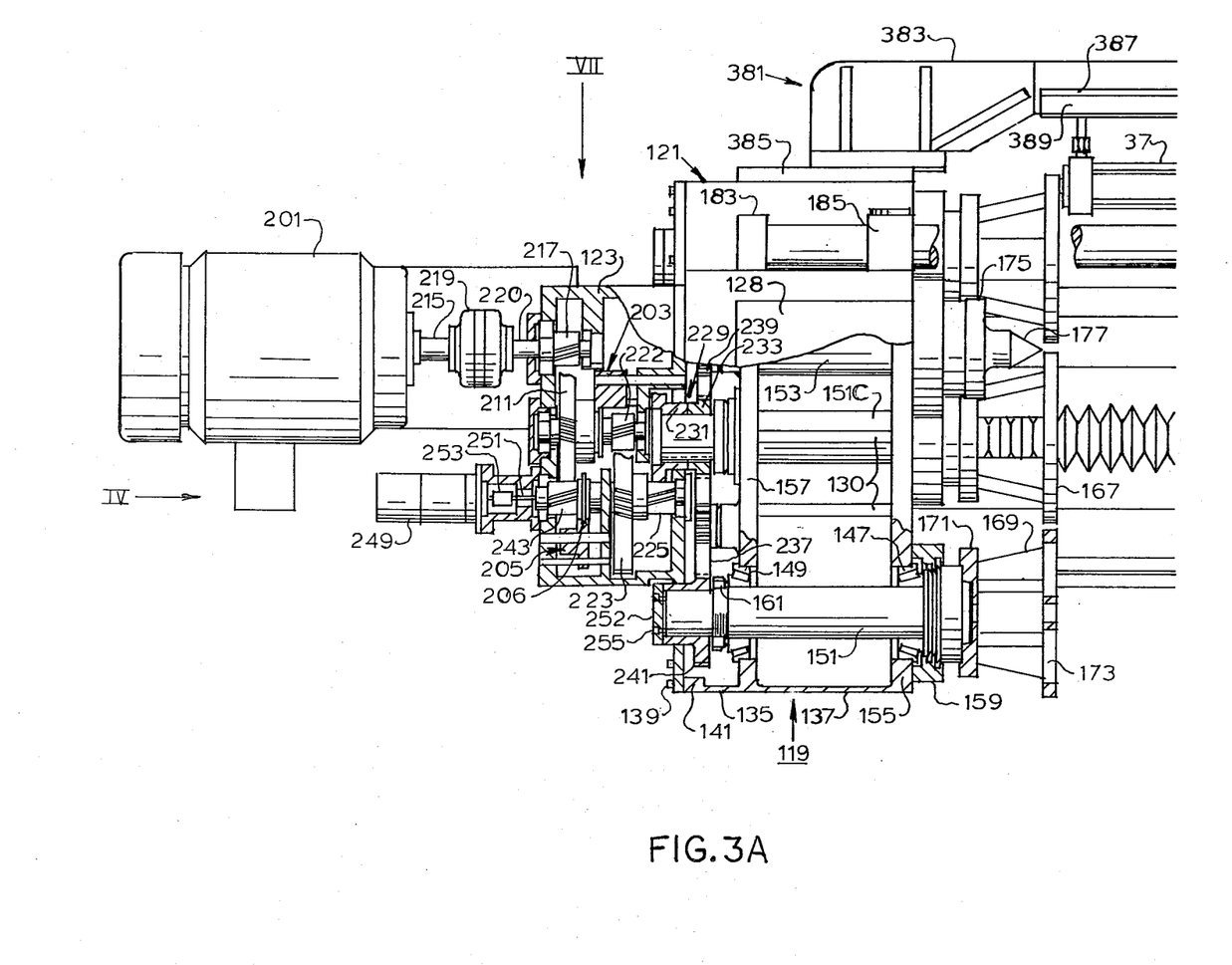
FIGS. 3A and 3B together are a plan view, partly in section, taken in the direction of arrow III of FIG. 2B.

The headstock 119 (FIG. 3A) includes a housing 121 and a gear box 123. The housing 121 is a casting having flanges 125 (FIG. 2A) which engage base 103 and are bolted to it. The upper part of the side of housing 121 has a cover 127. The top has a removable cover 128. The housing is strengthened by braces 130 (FIG. 3A).

Viewed vertically, (left-to-right FIG. 4) the gear box 123 has the form of a rectangle (FIG. 4) from whose vertical sides wings 131 and 133 extends. The gear box 123 is mounted on an extension 135 of the side wall 137 (FIG. 3A) of housing 121 by bolts 139 which are screwed into a thickened rim 141 of the extension. The gear box 123 has flanges 143 (FIG. 2A). Bolts 145 pass through the flanges and secure the gear box 123 to the base or bed plate 103.

Figure 3B:
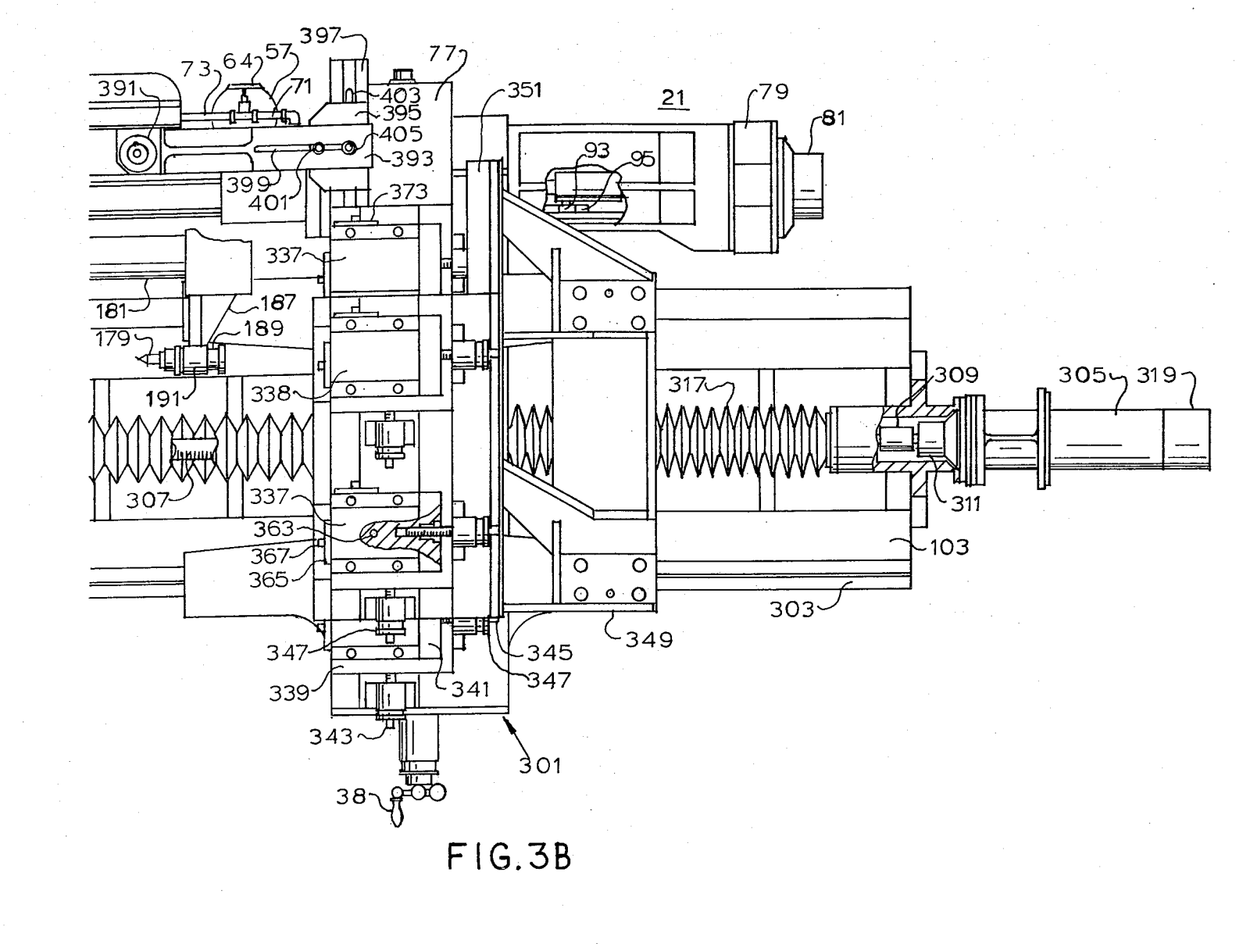
Figure 4:
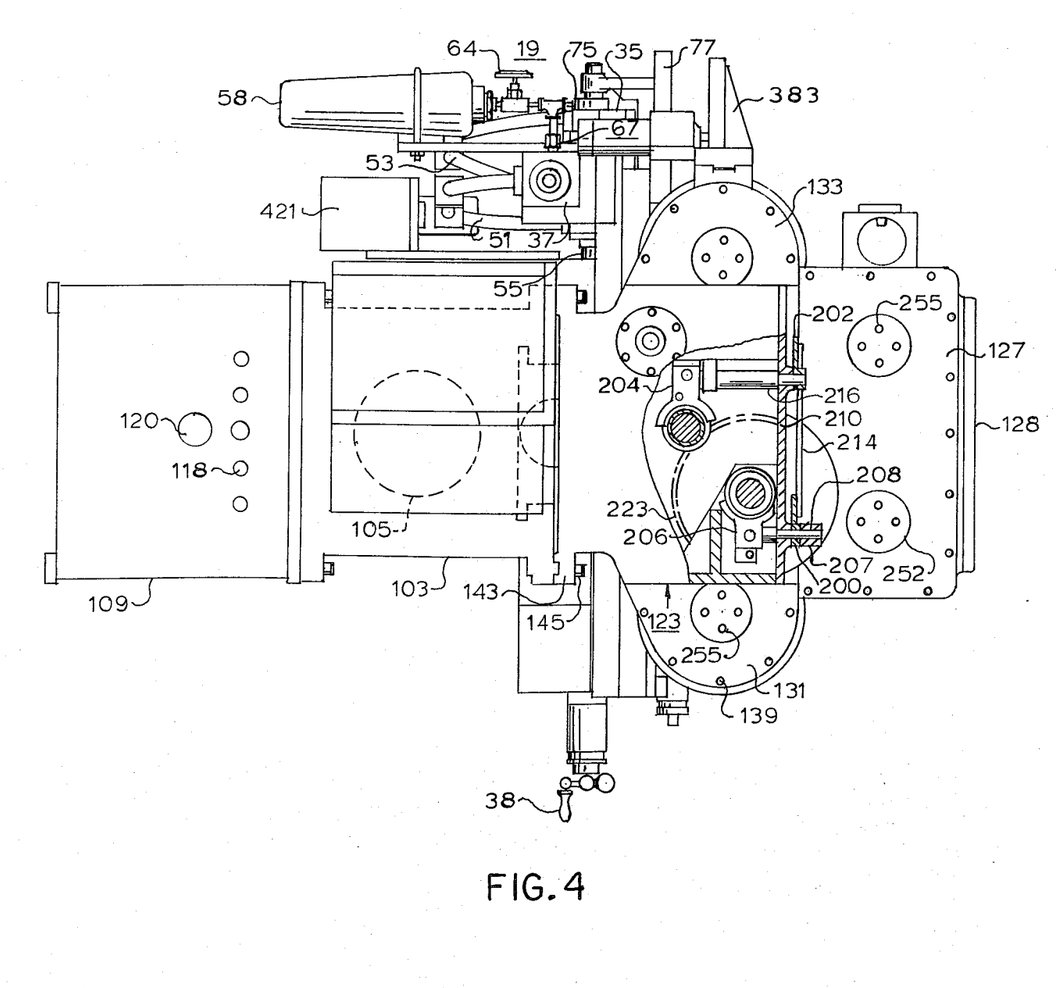
FIG. 4 is an end view with parts broken away and sectioned taken in the direction of the arrow IV of FIG. 3A.

The front and rear bearings 147 and 149 (only one set shown) for spindles 151 and 153 (FIG. 3A) are mounted in front and rear walls 155 and 157 of housing 121. There are four spindles 151 each supporting a blank; spindle 153 supports master 15. The front bearing 147 is held by a cap 159 secured to front wall 155. The rear bearing 149 is held by a lock nut 161. The spindle 151 has a head 163 to which the blank-supporting unit 165 is secured (FIG. 2A). Each blank-supporting unit 165 includes a face plate 167 which has legs 169 (FIG. 3A). To the ends of the legs, a supporting ring 171 is secured. The ring 171 is bolted to head 163. The face plate has slots 173 for adjustably mounting a blank 13. The master spindle 153 has a head 175 from which a center 177 is supported. A cooperative center 179 (FIG. 3B) is supported from an overarm 181 held in bosses 183 and 185 (FIG. 7B) extending from housing 121 and a bracket 187. This center 179 extends from a screw 189 which is axially adjustable in a socket 191 on the bracket 187 (FIG. 3B).

Typically, there are two spindles in the upper part of the headstock 119 and three spindles in the lower part. One of the upper spindles 153 carries the center 177 for the master (FIG. 2A). The other spindles carry face plate units 165.

The drive for rotating the spindles 151 and 153 includes a motor 201 and gears which are appropriately journaled within the gear box 123 (FIG. 3A). Clutch mechanisms 203 and 205 are provided to rotate the spindles 151 and 153 selectively at a lower speed or at a higher speed. The clutch mechanisms 203 and 205 are operated by respective shifters 204 (fork FIG. 4) and 206 including an offset handle 207 (FIGS. 2A, 4, 7B) keyed to a shaft 208 (FIG. 4) pivotal in cover 210 (FIG. 4) of the gear box. The shaft 208 actuates the shifter 206 of the clutch mechanism 205 in dependence upon the setting of handle 207. The shaft 208 is connected to the shifter 204 for operating clutch mechanism 203 through a tie bar 214 and linkages 200 and 202. Through tie bar 214 handle 207 pivots shaft 216 which operates shifter fork 204. In one position of handle 207, clutch mechanism 203 is in operation; in the other, mechanism 205 is in operation.

As shown in the drawings (FIG. 3A), the speed shifter is set to the left for the lower speed with clutch mechanism 203 is operative engagement with a gear 211 through shifter 204. Shifter 206 of clutch mechansim 205 is out of driving engagement with its cooperative pinion 243.

The shaft 215 of motor 201 drives pinion 217 through a coupling 219 (FIG. 3A). The shaft 220 of pinion 217 and shaft 215 are individually keyed to coupling 219 by a key (not shown). Pinion 217 meshes with and drives gear 211. With the clutch mechanism 203 in operation, gear 211 drives pinion 222. Pinion 222 drives gear 223. Gear 223 is keyed to shaft 224 by a key (not shown). Pinion 225 is driven by gear 223. Pinion 225 drives gear 229. Gear 229 is formed of two parts 231 and 233 keyed together by a key (not shown). Gear 229 drives idler gears 237 and 239. Each of the idler gears meshes with two gear 241. Each of the gears 241 drives one of the spindles 151 that rotate the blanks 13 and the spindle 153 that rotates the master 15.

In either position of the clutch mechanisms 203 and 205, pinion 217 drives gear 211 and gear 211 drives pinion 243. But with the clutch mechanisms 203 and 205 shifted to the right pinion 243 performs no spindle-driving function. With the clutch mechanisms 203 and 205 shifted to the left, in the higher speed setting of the apparatus, pinion 243 drives pinion 225. Pinion 225 drives the two part gear 229 which in turn drives idlers 237 and 239 and through them the gears 241.

The velocity of the spindles 151 and 153 is measured by a tachometer 249. The tachometer 249 is driven by pinion 225 through shaft 251 and coupling 253. Shaft 251 passes through gear 243. In the lower speed operation with clutch mechanism 203 in mesh, pinion 225 and the tachometer are driven by pinion 222; in in the higher speed operation with clutch mechanism 205 in mesh, pinion 225 is driven by pinion 243.

Each of the four gears 241 has a cap 252. In normal operation, the cap 252 is secured to the spindle 151 or 153 by bolts 255 and the gears 241 drive the spindles through the cap. By unscrewing the bolts 255, each spindle is disconnected from its gear 241 and may be moved independently of the gear. The spindles 151 and 153 may then be set so that the cutting heads 36 and the tracer head 29 are in the same phase position. The central spindle 151 C is driven directly by double gear 229. The other spindles 151 and 153 are phase positioned with reference to spindle 151C.

Figure 6:
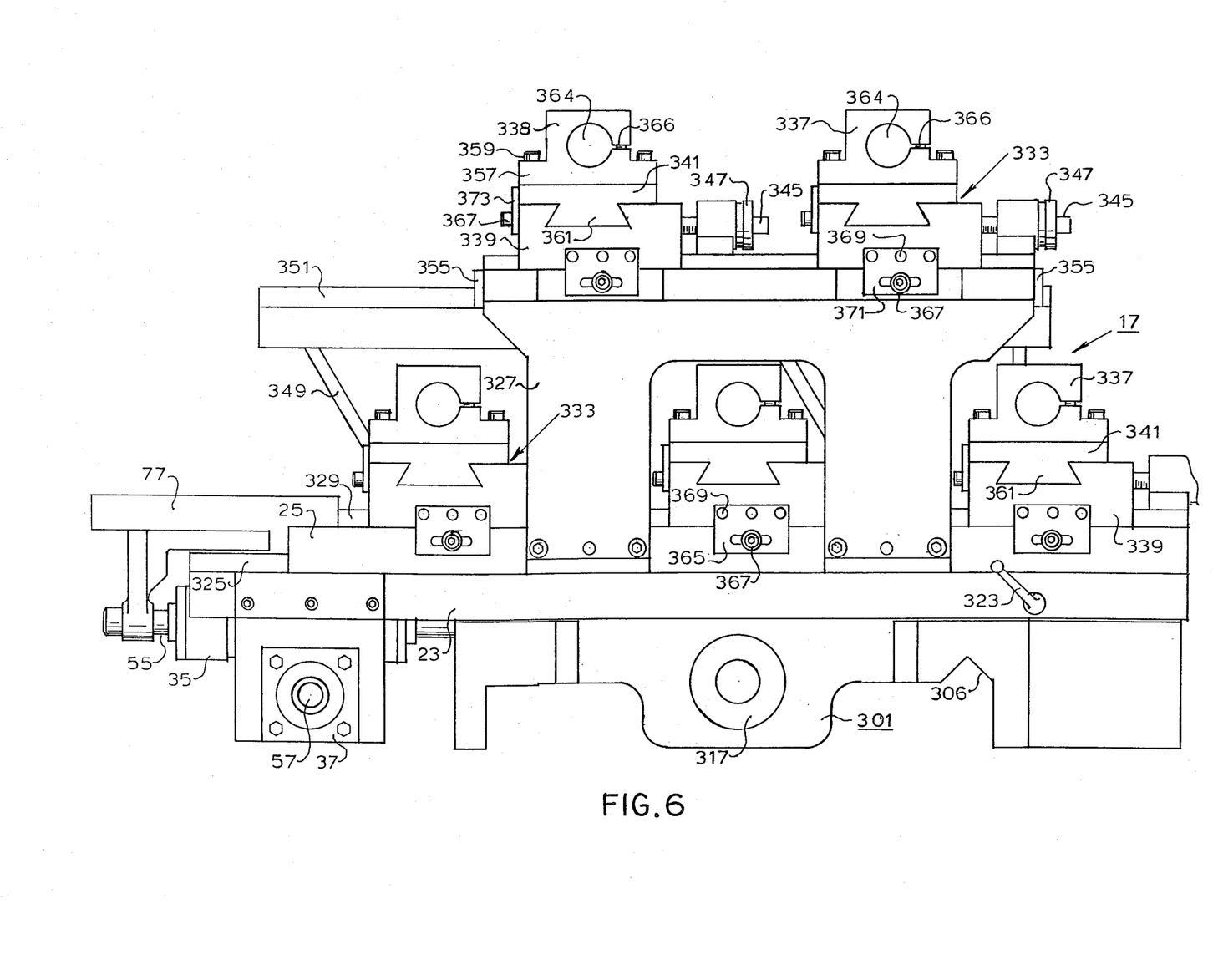
FIG. 6 is an end view of this carriage taken in the direction of the arrow VI of FIG. 2B.
Figure 7A:
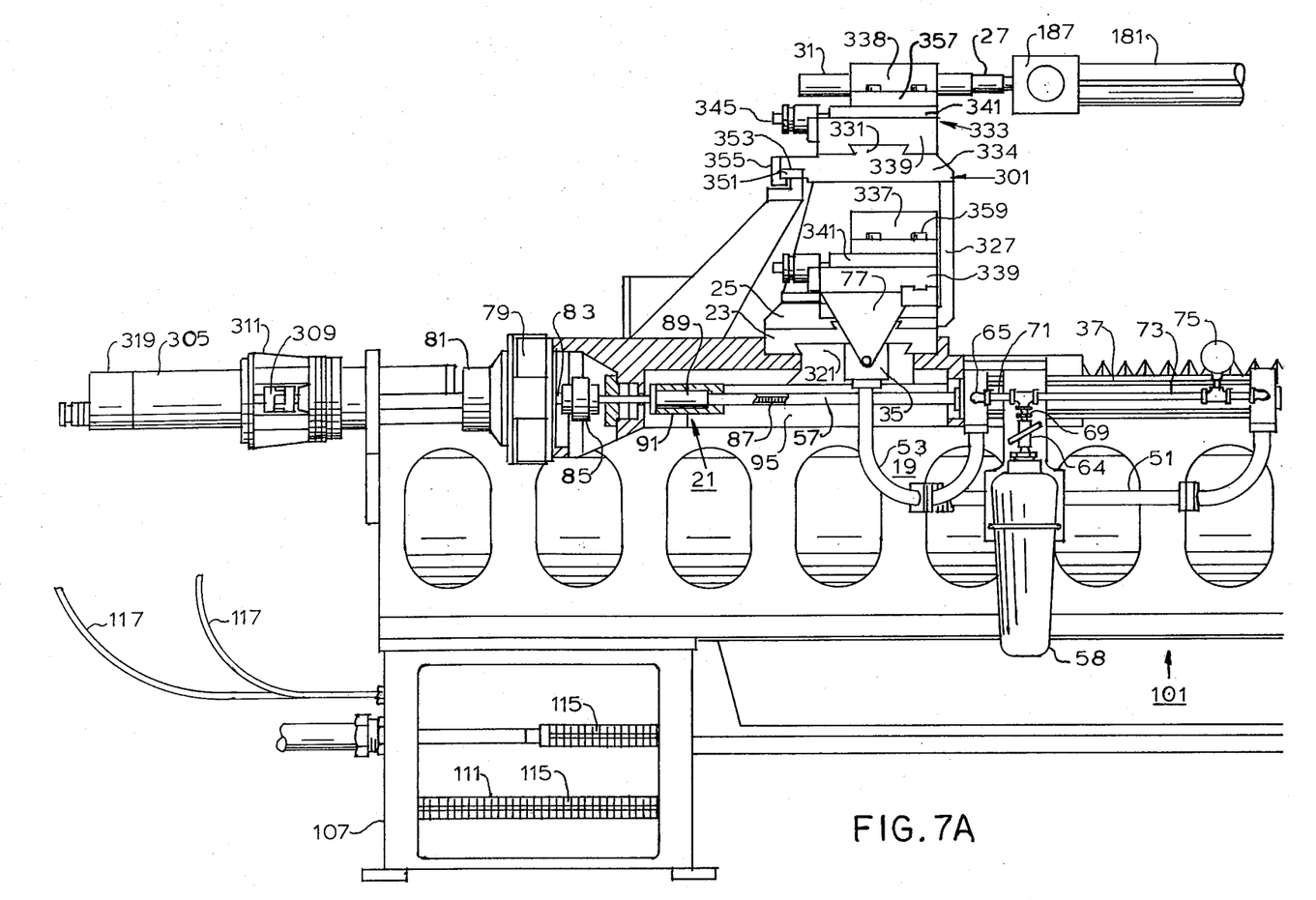
FIGS. 7A and 7B together are a rear view of the embodiment shown in FIGS. 2A and 2B taken in direction of the arrow VII of FIG. 3A.
Figure 7B:
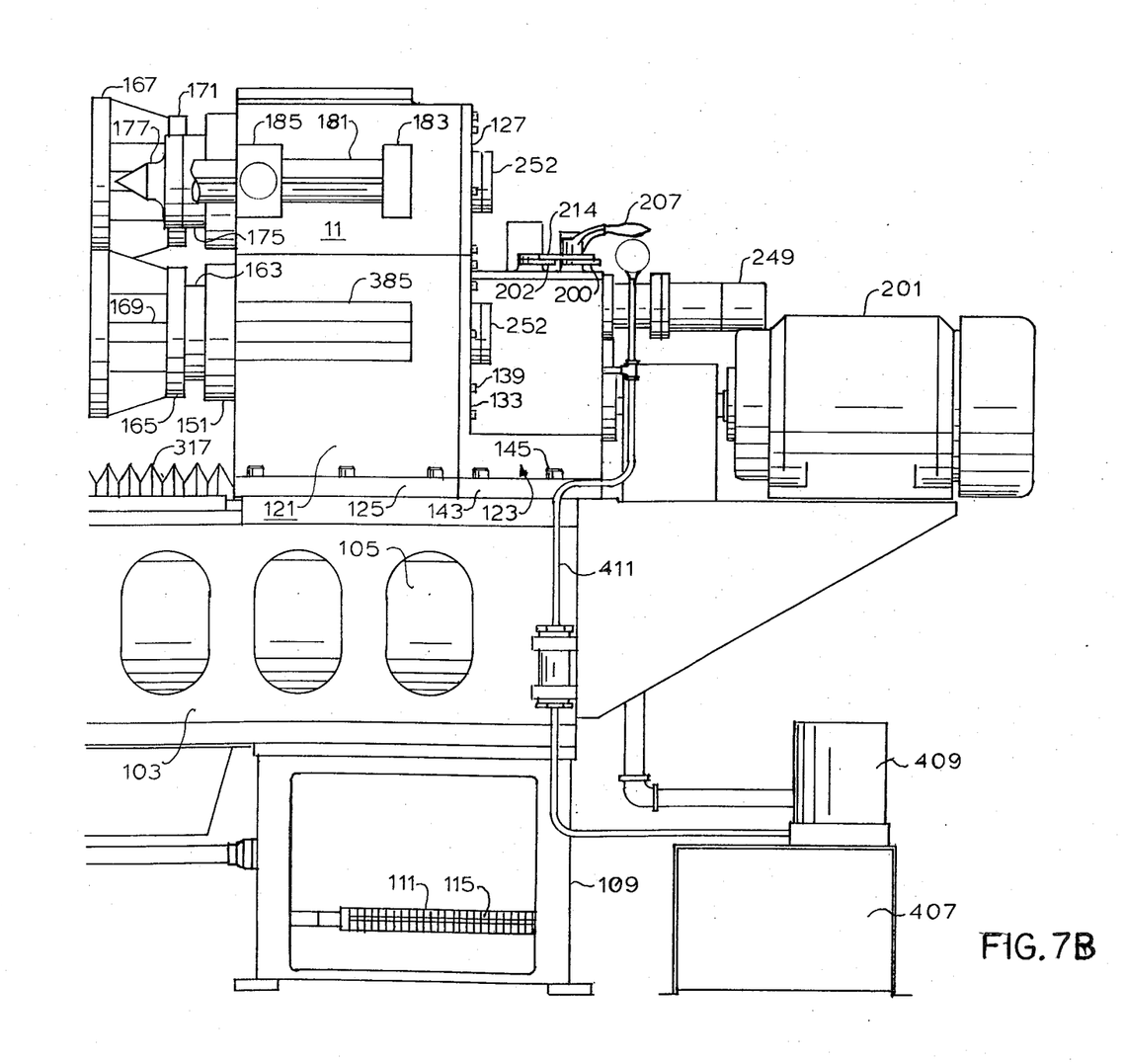

The tracer 27 and tools 34 are mounted on carriage 301 (FIG. 7A). They are movable axially and transversely of the master 15 and blanks 13. The carriage 301 is driven axially of the master and blanks on V-way 303 (FIGS. 3B, 6) on base or bed-plate 103 by servo motor 305. The V-way engages V-groove 306 (FIGS. 5, 6) in the carriage. The motor drives a ball screw 307 (FIGS. 3B, 8) through coupling 309 and speed reducer 311. The ball screw 307 drives a ball nut 313 (FIG. 5) which is connected to the carriage 301. The ball screw 307 is protected by a bellows 317. The motor 305 also drives a tachometer 319.

Figure 5:
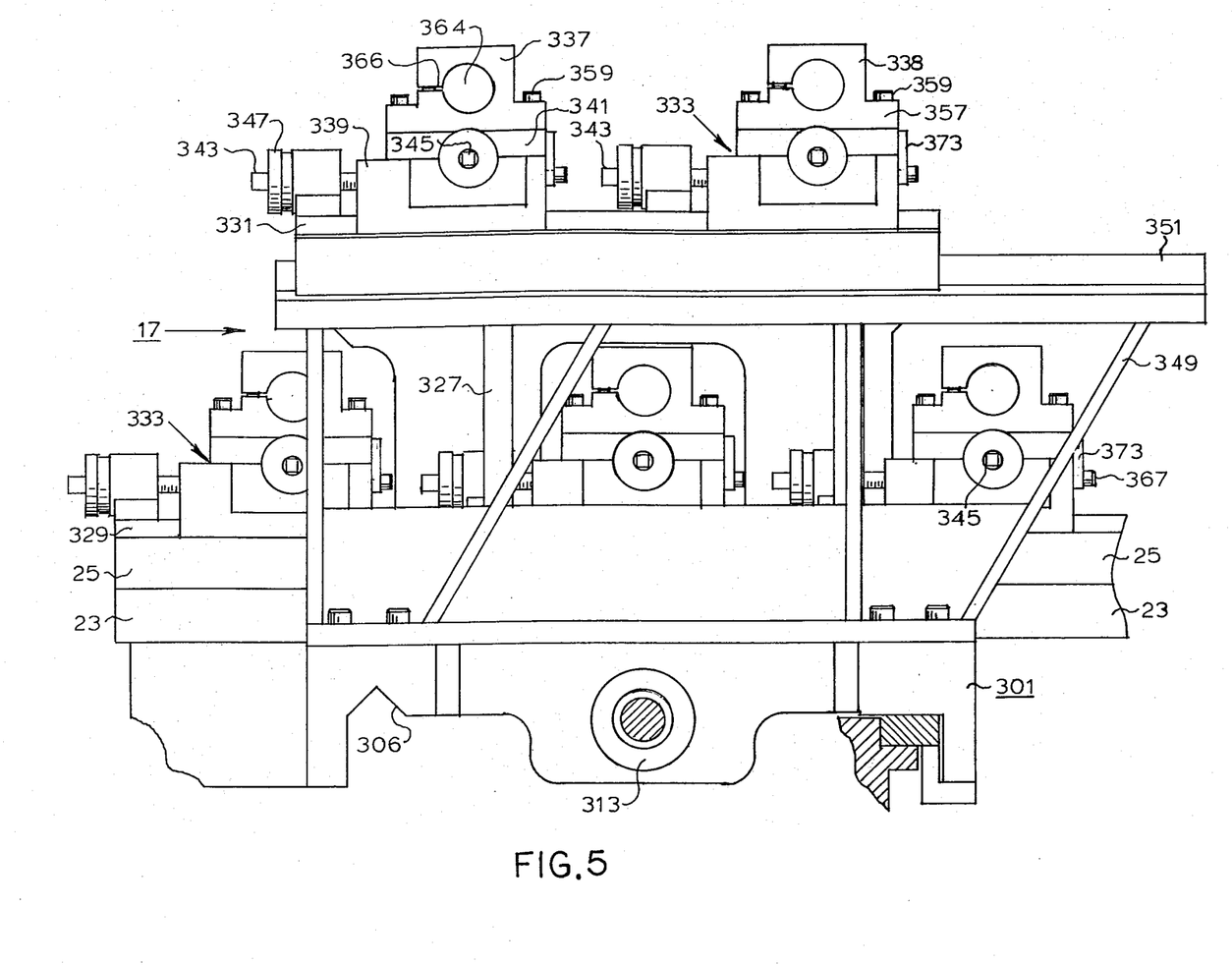
FIG. 5 is an end view of the carriage of the embodiment shown in FIGS. 2A and 2B taken in the direction of the arrow V of FIG. 2B.

The bottom slide 23 (FIG. 2B) is moved for adjusting purposes by manual handle 38 on a dovetail 321. This slide 23 serves to set the tools 34 and the tracer 29 transversely manually in appropriate positions. This slide may be locked in any position by handle 323. The tracer slide 25 is a cross slide and is actuated by bracket 77 under the influence of piston rod 55 to slide transversely on dovetail 325 (FIG. 6). Tracer slide 25 carries bracket 327 (FIG. 2B) which in turn carries dovetails 329 and 331 (FIG. 5) on which the a plurality of compound slides 333 are slideable transversely. The dovetail 331 extends integrally from a plate 334 extending from the top of bracket 327. The compound slides 333 carry the tool blocks 337 and the tracer block 338 (FIG. 5). Each of the compound slides 333 has a lower slide, or a cross slide 339 (FIG. 5) movable transversely and an upper slide 341 movable axially of the blanks 13 and master 15. The lower slides 339 are set by adjusting screws 343 and the upper slide by adjusting screw 345. The screws 343 and 345 serve to set the positions of the tools 34 and tracer 39. They are provided with dials 347 to facilitate the setting.

The upper assembly, including the dovetail 331, the compound slide 333 and the blocks 338 and 337 for the tracer 27 and tool 34 respectively, are supported on a massive bracket 349 extending from the carriage 301. The bracket 349 has a way 351 having a coating 353 of teflon (polytetrafluoroethylyn) on which this assembly slides transversely. The assembly carries a wiper 355 which engages the way 351.

The tool blocks 337 and the tracer block 338 each has flanges 357. Each block is secured to each upper block slide 341 of the compound slides 333 by bolts 359. Each upper slide 341 has a dovetail 361 (FIG. 6) which engages and slides axially in a dovetail slot in lower slide 339. Each block 337 and 338 is slightly pivotal on a pin 363 (FIG. 3B) permitting slight angular adjustment. The tracer 27 is clamped in a hole 364 (FIG. 5) in block 338 and the tools are clamped in a hole 364 in blocks 337. For this purpose, each block has a slit 366 extending from the hole 364 just above the flange 357 on one side. The tools 34 or tracer 27 are clamped by a screw passing through the slit 366 and reducing its width.

Locking plates 365 (FIG. 6) are connected between the tracer 23 and each lower slide 339 of the three which carry the lower tool blocks. After each lower slide 339 is positioned by screw 345, the slides 23 and 339 are locked together by screw 367 and screws 369. Likewise, locking plates 371 are provided between the bracket 327 and each slide 339 and locking plates 373 (FIG. 5) are provided between each lower slide 339 and the upper slide 341 which slides upon it.

The apparatus also includes a system 381 (FIGS. 3A, 3B) for controlling the shaping of the blank by a master. This system 381 includes a bracket 383 which is bolted to a plate 385 on one side of the housing 121 of the headstock and overhangs the housing 121. The template (not shown) is held between plate 387 bolted to the bracket 383 and a plate 389 which is secured to plate 387. The system 381 also includes a stylus or follower 391 which is mounted on a bracket 393 in position to engage the template. The bracket 393 extends from supports 395 and 397 which are secured to the bracket 77 that controls the transverse displacement of the blanks 13 through the tracer slide 25. The bracket 393 has a slot 399 penetrated by a bolt 401 for adjusting the axial position of the stylus 391. The support 397 has a slot 403 engaged by a bolt 405 for adjusting the transverse position of the stylus.

Figures 2B, 8:
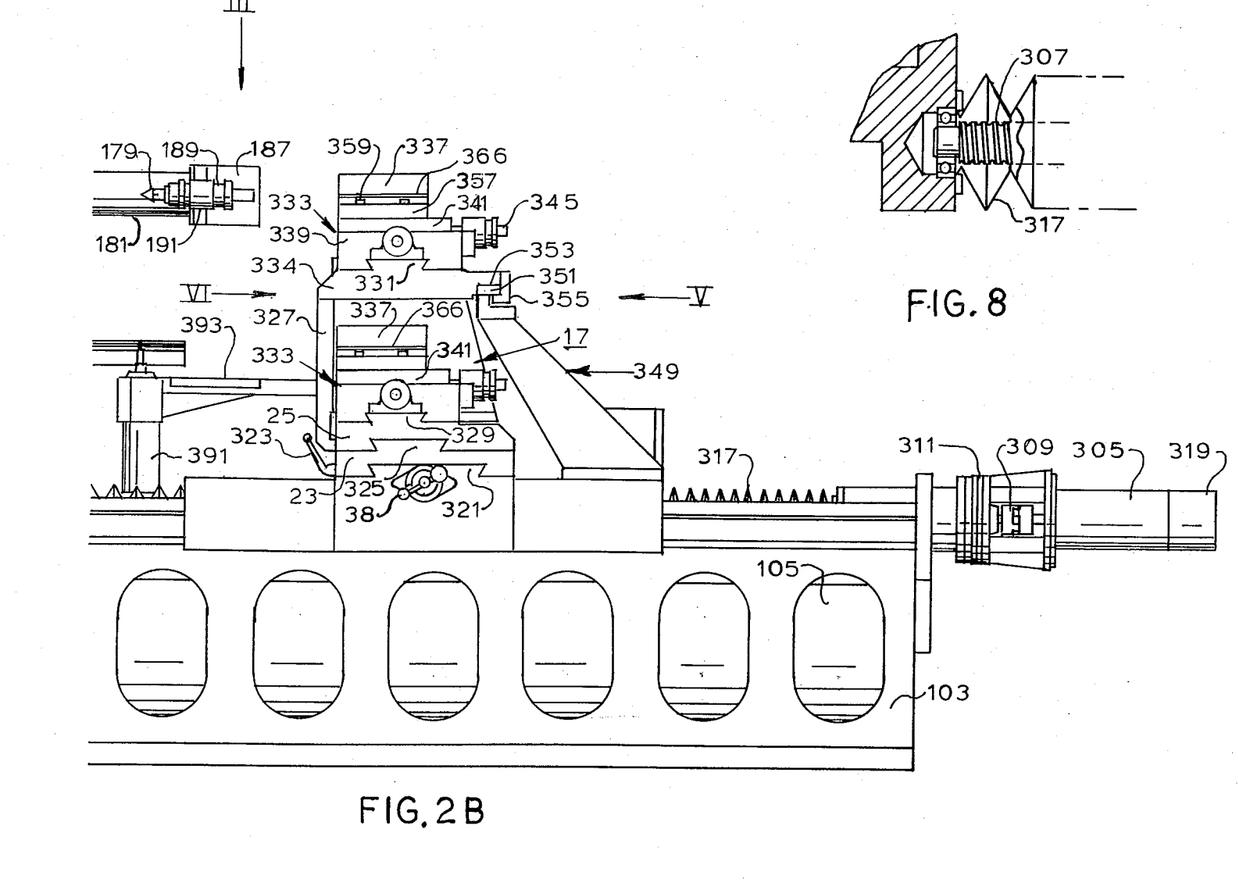
FIG. 8 is a view partly in section of the part in the circle VIII of FIG. 2A enlarged.

Once properly adjusted, the stylus 391 is moved axially along the template by motor 305 and screw 307 (FIGS. 3B, 8). As the stylus is moved it is displaced transversely by the template in accordance with its contour correspondingly displacing the tracer slide 25 and the tools 34. The stylus 391 may be connected to a transducer which controls the pistons 41 and 39 to control the movement of bracket 77. The wiring extends through the stylus.

The apparatus also includes an oil reservoir 407 and a motor driven pump 409 for lubricating the apparatus through conductor 411. Lubricator 421 (FIG. 4) serves to lubricate the ways of the machine.

While preferred embodiments of this invention have been disclosed herein, many modifications thereof are feasible. For example, the apparatus disclosed herein may be used for remote control of apparatus other than that disclosed herein. This invention is not to be restricted except insofar as is necessitated by the spirit of the prior art.

I claim:

1. Apparatus for forming from at least one blank a part having the shape determined by a master, including means for supporting said blank, means for supporting said master, the axes along which said blank and master are supported being generally parallel, means, connected to said blank-supporting means and to said master-supporting means, for rotating said blank in synchronism with said master, a carriage, means moving said carriage generally parallel to the axes of said blank and master, a tracer, a cutting tool, means mounting said tracer on said carriage in engagement with the contour of said master so that it follows the said contour, as said master rotates, generally transversely to the axes of said master, means mounting said cutting tool on said carriage in cutting engagement with said blank so that it cuts a contour in said blank as said blank rotates, solely electromechanical means, connected to said tracer, for converting the said following movement of said tracer into rotary movement, a closed-loop fluid system including a piston movable in one direction or the opposite direction as the pressure of said fluid on said piston changes, means, responsive to said converting means, connected to said closed-loop fluid system, for actuating said piston to move in accordance with the following movement of said tracer, said actuating means being free of any valve means operable responsive to the following movement of said tracer to control the flow of fluid from a reservoir to said fluid system and means, connected to said piston, for moving said tracer and tool in accordance with the movement of said piston so that said tool cuts a contour corresponding to said tracer in said blank.

2. The apparatus of claim 1 wherein the closed-loop fluid system includes a main fluid cylinder containing the tracer-and-tool moving piston (herein called main piston), and an auxiliary cylinder containing an auxiliary piston, said main piston dividing said main cylinder into a first chamber and a second chamber, increase of fluid in said first chamber moving said main piston in one direction and increase of fluid in said second chamber moving said main piston in the opposite direction, said auxiliary piston dividing said auxiliary cylinder into a third chamber and a fourth chamber, means connecting said first chamber to said fourth chamber and said second chamber to said third chamber so that movement of said auxiliary piston in a first direction causes fluid to flow from said fourth chamber to said first chamber moving said main piston in said one direction and causing fluid to flow from said second chamber to said third chamber and movement of said auxiliary piston in a second direction causes fluid to flow from said third chamber to said second chamber moving said main piston in said opposite direction and causing fluid to flow from said first chamber to said fourth chamber, the actuating means including means, connecting the converting means to said auxiliary piston, for moving said auxiliary piston in said first or said second direction in dependence upon the direction of rotary movement to which the tracer movement is converted, whereby the generally transverse movement of the tracer and tool follows the movement of said tracer.

3. The apparatus of claim 2 wherein the transverse cross-section bore of the auxiliary cylinder is substantially smaller than the transverse cross-sectional bore of the main cylinder whereby translational movement of the auxiliary piston produces substantial smaller translational movement of the main piston.

4. The apparatus of claim 2, wherein the converting means includes a motor of low inertia, said motor being connected to the auxiliary piston to move said auxiliary piston as stated in claim 2.

5. The apparatus of claim 1 including an accumulator, connected to the closed-loop fluid system and means, connected to said accumulator, responsive to the pressure in said system for replenishing and fluid which undersirably leaks out of said system.

6. Apparatus for forming from at least one blank a part having a shape determined by the contour of a master, said apparatus including a tracer to engage the contour of said master in contour following relationship, a cutting tool to engage said blank in shaping relationship, means, connected to said tracer for actuating said tracer to follow the contour of a master with which said tracer is engaged as aforesaid, means connected to said cutting tool for actuating said cutting tool to shape a blank with which said cutting tool is engaged as aforesaid, said means for actuating including a closed-loop fluid system, a piston within said system, movable in accordance with displacement of fluid in said system on opposite faces of said piston, means, connected to said tracer, for displacing the fluid on opposite sides of said piston in accordance with the movement of said tracer in following said contour, said displacing means being free of any valve means operable responsive to the movement of said tracer for controlling the flow of fluid from a reservoir through said fluid system and means connected to said piston, for moving said tracer and cutting tool in accordance with the following movement of said tracer, whereby the cutting tool forms said part with the contour of said master.

7. The apparatus of claim 6 wherein the closed-loop fluid system includes a main fluid cylinder including the tracer-and-tool moving piston (herein called main piston) and an auxiliary cylinder including an auxiliary piston and the fluid displacing means includes said auxiliary piston and means, responsive to the following movement of the tracer, to move said auxiliary piston in accordance with the following movement of said tracer, to correspondingly displace the fluid on opposite faces of said main piston the linkage between said tracer and auxiliary piston being solely electromechanical.

8. The apparatus of claim 7 wherein the electromechanical means includes a screw and means for rotating said screw in accordance with the movement of the tracer and a nut engaged with said screw movable in accordance with the rotation of said screw and also includes means, connecting said nut to the auxiliary piston for moving said auxiliary piston in accordance with the movement of said nut, the main and auxiliary cylinders being so related that a displacement of the auxiliary piston produces a substantially smaller displacement of the main piston whereby brinelling of said screw is precluded.

9. Apparatus for shaping a blank with a cutting tool in accordance with the contour of a master followed by a tracer, the said apparatus including means for supporting and rotating said blank, means for supporting and rotating said master in synchronism with said blank, means for mounting said cutting tool in cutting engagement with said blank, means for mounting said tracer in following engagement with said master, and means, responsive to the movement of said tracer as it follows said master, for actuating said tool to shape said blank, the said apparatus being characterized by actuating means including a closed-loop fluid system including (a) a main cylinder having a main piston, said main piston dividing said main cylinder into a first chamber containing said fluid and a second chamber containing said fluid;

(b) an auxiliary cylinder having an auxiliary piston, said auxiliary piston dividing said auxiliary cylinder into a third chamber containing said fluid and a fourth chamber containing said fluid;

(c) a first conductor between said first and fourth chambers for conducting fluid back and forth between said first and fourth chambers;

(d) a second conductor between said second and third chambers for conducting fluid back and forth between said second and third chambers; the said actuating means also including means, connected to said tracer and to said auxiliary piston responsive to the following movement of said tracer, for displacing said auxiliary piston in a first direction causing fluid to flow from said second chamber to said third chamber and from said fourth chamber to said first chamber, displacing said main piston in a second direction, or for displacing said auxiliary piston in a third direction causing fluid to flow from said third chamber into said second chamber and from said first chamber into said fourth chamber, displacing said main piston in a fourth direction, and means, connected to said tracer and said tool, for moving said tracer and tool, in accordance with the displacement of said main piston in said second or fourth directions, to cause said tracer to follow said contour and said tool to shape said blank as aforesaid, the connection between the tracer and the auxiliary piston being solely electromechanical and including no valve means for controlling the flow of fluid to the fluid system.

10. The apparatus of claim 9 wherein the main and auxiliary cylinders are so related in volume that a displacement of the auxiliary piston produces a substantially smaller displacement of the main piston.

11. The apparatus of claim 9 wherein the displacing means connected between said tracer and auxiliary piston includes a motor, a screw rotatable by said motor, a nut in engagement with said screw, means, connected to said nut, for preventing rotation of said nut as said screw is rotated in engagement therewith whereby said nut moves back or forth as said screw is rotated, and means, connecting said nut to said auxiliary piston, for moving said auxiliary piston back and forth as said nut moves back and forth.

12. The apparatus of claim 11 wherein the motor is a low inertia motor.

13. The apparatus of claim 9 including an accumulator connected to the closed-loop fluid system and operable independently of the movement of the tracer for replenishing the fluid in said system as it is reduced undesireably by leakage.

14. The apparatus of claim 13 wherein the accumulator is connected to the auxiliary cylinder through a check valve.

15. The apparatus of claim 9 wherein the displacing means includes a screw connected to the tracer and means for rotating said screw in accordance with the following movement of the tracer and a nut, in engagement with the screw, to be advanced or retracted in accordance with the rotation of said screw, the said apparatus also including means, connecting said nut to the auxiliary piston, for advancing or retracting said auxiliary piston in accordance with the advancement or retraction of said nut, the volume of the auxiliary cylinder being so related to the volume of the main cylinder, that to produce a displacement of the main piston a substantially larger displacement of the auxiliary piston is produced whereby brinelling of the screw by the nut is precluded.

16. The apparatus of claim 9 wherein the displacing means is electromechanical means free of fluid valve means for controlling the flow of fluid from a reservoir.

* * * * *